United States Patent
Muller (10) Patent No.: US 10,295,225 B2
(45) Date of Patent: May 21, 2019

(54) THERMAL APPARATUS (71) Applicant: COOLTECH APPLICATIONS S.A.S., Holtzheim (FR)

(72) Inventor: Christian Muller, Strasbourg (FR)

(73) Assignee: COOLTECH APPLICATIONS S.A.S., Holtzheim (FR)

(*) Notice: Subject to any disclaimer, the term of this patent is extended or adjusted under 35 U.S.C. 154(b) by 548 days.

(21) Appl. No.: 14/772,954

(22) PCT Filed: Mar. 14, 2014

(86) PCT No.: PCT/IB2014/000344
§ 371 (c)(1),
(2) Date: Sep. 4, 2015

(87) PCT Pub. No.: WO2014/140762
PCT Pub. Date: Sep. 18, 2014

(65) Prior Publication Data
US 2016/0010900 A1  Jan. 14, 2016

(30) Foreign Application Priority Data
Mar. 14, 2013  (FR) ...................... 13 52271

(51) Int. Cl.
  *F25B 21/00*  (2006.01)
  *F28D 15/00*  (2006.01)
  *F28D 21/00*  (2006.01)
(52) U.S. Cl.
  CPC .............. *F25B 21/00* (2013.01); *F28D 15/00* (2013.01); *F28D 21/00* (2013.01); *Y02B 30/66* (2013.01)
(58) Field of Classification Search
  CPC .......... F25B 21/00; F28D 15/00; F28D 21/00; Y02B 30/66
  (Continued)

(56) References Cited

U.S. PATENT DOCUMENTS

| 2,589,775 A | 3/1952 | Chilowsky |
| 4,107,935 A | 8/1978 | Steyert, Jr. |

(Continued)

FOREIGN PATENT DOCUMENTS

| FR | 997 056 | 12/1951 |
| FR | 2 919 687 A1 | 2/2009 |

(Continued)

OTHER PUBLICATIONS

Gao Q et al: "Experimental Investigation on Refrigeration Performance of a Reciprocating Active Magnetic Regenerator of Room Temperature Magnetic Refrigeration", International Journal of Refrigeration, Elsevier, Paris, France, vol. 29, No. 8, Dec. 1, 2006.

*Primary Examiner* — Frantz F Jules
*Assistant Examiner* — Steve S Tanenbaum
(74) *Attorney, Agent, or Firm* — Daivs & Bujold PLLC; Michael J. Bujold (57) ABSTRACT

A thermal apparatus (1) which comprises at least one primary circuit ($P_1$) in which a heat transfer primary fluid is moved, in a reciprocating movement, by a displacement device, and at least one heat exchange interface ($I_{1,1}$, $I_{1,2}$), of the primary fluid, in which a secondary fluid that unidirectionally in a secondary circuit ($S_{1,1}$, $S_{1,2}$). The apparatus is characterized in that the exchange interface ($I_{1,1}$, $I_{1,2}$) comprises at least one heat exchange zone ($Z_N$, $Z_{N+1}$, $Z'_N$, $Z'_{N+1}$) in which the primary fluid and the secondary fluid flow unidirectionally and countercurrent with respect to one another.

10 Claims, 8 Drawing Sheets

(58) Field of Classification Search
USPC .............................................................. 62/3.1
See application file for complete search history.

(56) References Cited

U.S. PATENT DOCUMENTS

| | | | |
|---|---|---|---|
| 4,727,721 A | | 3/1988 | Peschka et al. |
| 5,091,361 A | * | 2/1992 | Hed ........................ F25B 21/00 257/E39.018 |
| 5,249,424 A | * | 10/1993 | DeGregoria ............ F25B 21/00 62/3.1 |
| 8,348,637 B2 | | 1/2013 | Heitzler et al. |
| 2009/0178418 A1 | | 7/2009 | Wiest et al. |
| 2009/0308079 A1 | | 12/2009 | Lee |
| 2010/0236258 A1 | | 9/2010 | Heitzler et al. |
| 2011/0314836 A1 | * | 12/2011 | Heitzler ................. F25B 21/00 62/3.1 |

FOREIGN PATENT DOCUMENTS

| | | |
|---|---|---|
| FR | 2 943 407 A1 | 9/2010 |
| WO | 2009/087310 A2 | 7/2009 |

* cited by examiner

THERMAL APPARATUS

TECHNICAL SCOPE

This invention relates to a thermal apparatus comprising an apparatus core in which the thermal energy is produced and comprising at least one primary circuit in which a heat transfer fluid called primary fluid is circulating, said primary fluid being moved in the apparatus in a reciprocating movement by a displacement device, and at least one heat exchange interface of the primary fluid with a secondary fluid that circulates unidirectionally in a secondary circuit.

PRIOR ART:

A thermal apparatus must be able to exchange the thermal energy it produces with an external application. Such exchange is generally achieved by a heat exchanger preferably designed in order to perform an optimal heat exchange. In the case of thermal apparatuses whose primary fluid, that is to say the heat transfer fluid that transports the thermal energy produced by the thermal apparatus, is displaced in a reciprocating or alternated movement, the efficiency of the heat exchange between the primary fluid and the fluid of the external application or secondary fluid is problematic because of the change of the flow direction of the primary fluid, which results in a heat exchange that is sometimes countercurrent and sometimes co-current, and therefore not optimized.

For the purpose of this invention, a reciprocating or alternated displacement corresponds to a displacement with a regular change of the flow direction, that is to say with back and forth movements. This is in particular the case in the magnetocaloric thermal apparatuses in which the primary fluid is displaced in a reciprocating movement through magnetocaloric material so as to set up a thermal gradient.

These thermal apparatuses use the magnetocaloric effect (MCE) of certain materials, which consists in a variation of their temperature when they are subjected to a magnetic field. In such apparatuses, the magnetocaloric materials are subjected to a succession of magnetization and demagnetization phases and a heat exchange is performed with a primary heat transfer fluid to achieve the widest temperature variation possible in these materials (temperature gradient). For that purpose, the circulation of the primary fluid is alternated and this primary fluid circulates in channels or pores passing through the magnetocaloric material. A magnetocaloric cycle includes a magnetization phase and a demagnetization phase, which translates in energy available at every phase. This cycle is repeated up to frequencies of several Hertz. During these magnetic phases, the primary fluid flows through the material and will either heat up at the contact of the material during a so-called magnetization phase, or cool down at the contact of the material during a so-called demagnetization phase.

Therefore, in the thermal apparatuses using a reciprocating primary flow, the heat exchange with the secondary fluid strongly depends on the frequency of the flow direction changes, as well as on the temperature of the primary fluid. This phenomenon is amplified in the magnetocaloric thermal apparatuses in which the displaced heat transfer fluid performs the heat exchange either with a magnetocaloric material having undergone heating, or with a magnetocaloric material having undergone cooling. Since the primary fluid moves back and forth, its temperature is averaged in the exchanger(s), which inevitably leads to a loss of efficiency of the thermal apparatus.

Moreover, when the frequency of the changes of the magnetization and flow direction of the primary fluid increases, the thermal output (for example: the cooling) liable to be provided by the magnetocaloric thermal apparatus increases too. Now, this frequency increase has a negative effect on the heat exchange between the primary fluid and the secondary fluid, as the exchange time decreases. This results in a decrease of the efficiency of the thermal apparatus.

Thus, to exploit the power of a thermal apparatus, it is necessary to have heat exchange characteristics between the primary circuit and the secondary circuit that be improved, optimized, and as long and constant as possible. As explained, mastering the heat exchanges of the primary circuit of a thermal apparatus with a secondary circuit is problematic in the case of a primary circuit using a sequential reciprocating and discontinuous displacement of the primary fluid.

DESCRIPTION OF THE INVENTION:

The present invention aims to remedy these disadvantages by offering a solution for the problems mentioned above with a thermal apparatus manufactured so that the thermal energy transfer between the primary fluid and the external application(s) is optimized.

To that purpose, the invention relates to a thermal apparatus of the kind described in the preamble, characterized in that said primary circuit is divided into several unidirectional primary circuit portions at the level of division points located at the outlet of said thermal apparatus core so that, at every flow direction change of the primary fluid, the latter is displaced either in one portion of the unidirectional primary circuit or in the other corresponding portion, in that every portion of unidirectional primary circuit is delimited by two division points and in that said interface is arranged between two division points and comprises at least one heat exchange zone in which the primary fluid and the secondary fluid flow unidirectionally and countercurrent with respect to each other.

Providing heat exchange zones in which the fluids having to perform the heat exchange, that is to say the primary fluid and the secondary fluid, move in two opposite directions or countercurrent, allows achieving a better energy transfer in said exchange zones and therefore making the temperatures of the primary and secondary fluids converge better.

According to the invention, said displacement device can be integrated in the section of said primary circuit in which the fluid moves alternately in two opposite directions.

To that purpose, said displacement device can be integrated in the core of said thermal apparatus.

According to the invention, said primary circuit can comprise unidirectional primary circuit portions provided with a device controlling the flow direction of the primary fluid, parameterized to force the unidirectional flow direction of said primary fluid in these portions.

This parameterization can be achieved by a control device of the check valve type or by any other similar device performing the same function, that is to say let the fluid pass in only one direction, such as for example hydraulic valves controlled electrically or by a pressure differential.

At least one of the exchange zones of said interface comprises advantageously at least one of said unidirectional primary circuit portions. Depending on the number of unidirectional primary circuit portions present in an exchange zone of the interface, it is therefore advantageously possible to module the quantity of thermal energy liable to be exchanged.

Said primary circuit can this way preferably be divided into al least two unidirectional primary circuit portions.

According, to the invention, each of said unidirectional primary circuit portions can be integrated, at least partly, in a heat exchange zone.

As a variant, at least one of said unidirectional primary circuit portions may not be integrated, at least partly, in a heat exchange zone.

Moreover, according to a variant, said heat exchange zone can comprise at least one common unidirectional primary circuit portion, in which several portions of said unidirectional primary circuit come together.

According to the invention, said exchange interface can comprise several portions of a same secondary circuit.

As a variant, said exchange interface can comprise portions of several secondary circuits.

The thermal apparatus according to the invention can comprise several primary circuits and said heat exchange zone can comprise at least a part of a common unidirectional primary circuit portion, in which the primary fluids of said primary circuits come together.

The thermal apparatus according to the invention can moreover comprise a magnetocaloric element forming the core of said apparatus and through which passes said primary fluid, and a magnetic arrangement put into motion to subject alternately said magnetocaloric element to a magnetic field variation and create alternately in said magnetocaloric element a heating phase and a cooling phase.

Said division points can preferably be positioned at the level of the primary fluid outlet area of said magnetocaloric element.

BRIEF DESCRIPTION OF THE DRAWINGS:

The present invention and its advantages will be better revealed in the following description of several embodiment variants given as non limiting examples, in reference to the drawings in appendix, in which.

ILLUSTRATIONS OF THE INVENTION AND VARIOUS WAYS OF REALIZING IT:

In the illustrated embodiment examples, the identical elements or parts have the same numerical references.

The invention is not restricted to a specific type of thermal apparatus. It relates to any thermal apparatus comprising a heat transfer fluid or primary fluid displaced apparatus and to transfer it by heat exchange to another heat transfer fluid called secondary fluid whose displacement is unidirectional. The primary fluid and the secondary fluid are preferably liquids. Moreover, the secondary fluid is preferably displaced in a continuous way by a pump or by any similar device.

The thermal apparatuses 1, 10, 20, 30, 40, 50, 60, 70 represented comprise an apparatus core referenced $G_1$, $G_{10}$, $G_{20}$, $G_{30}$, $G_{40}$, $G_{50}$, $G_{60}$, $G_{70}$ comprising one or several primary circuits $P_1$, $P_{10}$, $P_{10'}$, $P_{20}$, $P_{30}$, $P_{40}$, $P_{50}$, $P_{50'}$, $P_{60}$, $P_{60'}$, $P_{70}$ in which a heat transfer fluid called primary fluid circulates in a reciprocating or bidirectional movement. The thermal energy is produced in core $G_1$, $G_{10}$, $G_{20}$, $G_{30}$, $G_{40}$, $G_{50}$, $G_{60}$, $G_{70}$ of the apparatus. The primary fluid performs constant back-and-forth displacements in two opposite flow directions in primary circuit $P_1$, $P_{10}$, $P_{10'}$, $P_{20}$, $P_{30}$, $P_{40}$, $P_{50}$, $P_{50'}$, $P_{60}$, $P_{60'}$, $P_{70}$. This back and forth displacement can for example be produced by the piston of a double-acting cylinder that forms a displacement device 5 of the primary fluid. Of course, any other means able to displace the primary fluid, such as for example a membrane, may be used. Moreover, the displacement of the piston or similar can be controlled by an operating device that can be a cam, a magnetic device, a linear motor or any equivalent means able to move said piston back and forth. Preferably, and as represented in the attached figures, and more specifically in FIGS. 1 and 5, this operating device 5 is located in the core of thermal apparatus 1, 10, 20, 30, 40, 50, 60, 70, that is to say in the section of the primary circuit in which the fluid flows bidirectionally. This allows, on the one hand, thanks to the proximity of the operating device, to reduce the head losses in the core of thermal apparatus 1, 10, 20, 30, 40, 50, 60, 70 where the energy is produced, and thus to improve the efficiency of thermal apparatus 1, 10, 20, 30, 40, 50, 60, 70. On the other hand, this allows also improving the compactness of thermal apparatus 1, 10, 20, 30, 40, 50, 60, 70. A displacement device 5 can comprise an operating cam associated with rigid or flexible pistons such as membranes. A configuration such as that disclosed in publication WO 2009/087310 of the requester, incorporated by reference in this patent application, can, for example, be used.

Figure 1:
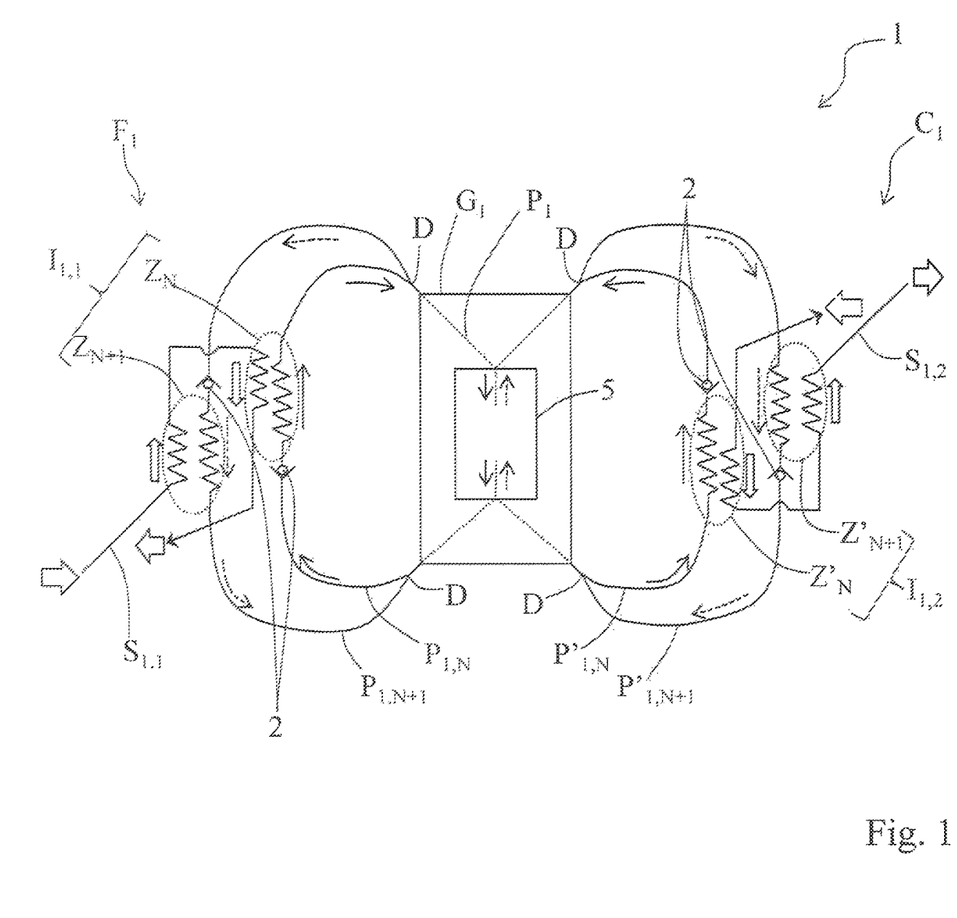
FIG. 1 is a schematic view of a thermal apparatus according to a first embodiment variant.

In the diagram of FIG. 1, as well as in the other diagrams, primary circuit $P_1$, $P_{10}$, $P_{10'}$, $P_{20}$, $P_{30}$, $P_{40}$, $P_{50}$, $P_{50'}$, $P_{60}$, $P_{60'}$, $P_{70}$ is represented very schematically. It may in particular comprise other non illustrated elements such as for example gaskets, channels, fluid diffusion systems, etc. Moreover, in the attached figures, primary circuit $P_1$, $P_{10}$, $P_{10'}$, $P_{20}$, $P_{30}$, $P_{40}$, $P_{50}$, $P_{50'}$, $P_{60}$, $P_{60'}$, $P_{70}$ is every time represented closed on itself, that is to say forming a loop. The invention is however not restricted to this configuration, and primary circuit $P_1$, $P_{10}$, $P_{10'}$, $P_{20}$, $P_{30}$, $P_{40}$, $P_{50}$, $P_{50'}$, $P_{60}$, $P_{60'}$, $P_{70}$ may not be closed on itself. Moreover, the thermal apparatus according to the invention can comprise several primary circuits with identical or different configurations. Primary circuit $P_1$, $P_{10}$, $P_{10'}$, $P_{20}$, $P_{30}$, $P_{40}$, $P_{50}$, $P_{50'}$, $P_{60}$, $P_{60'}$, $P_{70}$ is preferably closed, with a constant volume.

The arrows of FIGS. 1 to 8 illustrate the direction of flow of the primary fluid and of the secondary fluid in thermal apparatuses 1, 10, 20, 30, 40, 50, 60.

So, in reference to thermal apparatus 1 represented in FIG. 1, primary circuit $P_1$ comprises several unidirectional primary circuit portions $P_{1,N}$, $P_{1,N+1}$, $P'_{1,N}$, $P'_{1,N+1}$. This thermal apparatus 1 comprises a hot side $C_1$ on the right of the figure provided with two unidirectional primary circuit portions $P'_{1,N}$, $P'_{1,N+1}$ and a cold side $F_1$ on the left of the figure and comprising two other unidirectional primary circuit portions $P_{1,N}$, $P_{1,N+1}$. The unidirectional primary circuit portions $P_{1,N}$, $P_{1,N+1}$, $P'_{1,N}$, $P'_{1,N+1}$ comprise each a device 2 controlling the flow direction of the primary fluid. These devices 2 can be for example check valves.

Thermal apparatus 1 comprises, at the level of cold side $F_1$, an exchange interface $I_{1,1}$ formed by a heat exchanger whose exchange circuits integrate a part of secondary circuit $S_{1,1}$, in which a secondary fluid circulates, and unidirectional primary circuit portions $P_{1,N}$, $P_{1,N+1}$. Thermal apparatus 1 comprises heat exchange zones $Z_N$, $Z_{N+1}$, $Z'_N$, $Z'_{N+1}$ in which the primary and secondary fluids flow longitudinally with respect to each other. Likewise, at the level of hot side $C_1$, thermal apparatus 1 comprises an exchange interface $I_{1,2}$ formed by a heat exchanger whose exchange circuits integrate a part of secondary circuit $S_{1,2}$, in which a secondary fluid circulates, and unidirectional primary circuit portions $P'_{1,N}$, $P'_{1,N+1}$. The invention does not prejudge the structural configuration of these heat exchangers $I_{1,1}$, $I_{1,2}$, which can be plate exchangers, tubular exchangers or any other kind of heat exchangers. However the unidirectional primary circuit portions $P_{1,N}$, $P_{1,N+1}$, $P'_{1,N}$, $P'_{1,N+1}$, and the parts of secondary circuit $S_{1,1}$, $S_{1,2}$ must be connected with the respective heat exchanger in such a way that the primary and secondary fluids circulate countercurrent in it. This is possible thanks to the invention, and more specifically thanks to the division of primary circuit $P_1$ of thermal apparatus 1 into at least two circuit portions comprising each a device 2 controlling the flow direction of the primary fluid, imposing an opposite flow direction in the two circuit portions. From this results that one achieves in each of said unidirectional primary circuit portions a unidirectional flow direction of the heat transfer fluid. This then makes possible a countercurrent exchange with a secondary fluid that also flows unidirectionally and allows increasing the heat transfer capacity between the primary circuit and the secondary circuit. This explanation applies to all examples illustrated in this patent application.

The unidirectional primary circuit portions $P_{1,N}$, $P_{1,N+1}$, $P'_{1,N}$, $P'_{1,N+1}$ are associated by portion pairs in which the flow direction of the primary fluid is opposite. This way, the primary fluid flows in one unique direction in portions $P_{1,N}$ and $P'_{1,N}$ and in the unique opposite direction in portions $P_{1,N+1}$, $P'_{1,N+1}$, at the following iteration. In the rest of primary circuit $P_1$, the displacement of the primary fluid is alternated in a back and forth movement in both flow directions. Thanks to the invention, such primary fluid flow rectification in unidirectional primary circuit portions $P_{1,N}$, $P_{1,N+1}$, $P'_{1,N}$, $P'_{1,N+1}$ allows achieving very easily a countercurrent heat exchange with a secondary fluid that flows unidirectionally and continuously in a secondary circuit $S_{1,1}$, $S_{1,2}$. As mentioned before, this countercurrent heat exchange is achieved according to the invention in heat exchange zones $Z_N$, $Z_{N+1}$, $Z'_N$, $Z'_{N+1}$ that comprise or integrate a part of portions $P_{1,N}$, $P_{1,N+1}$, $P'_{1,N}$, $P'_{1,N+1}$. These heat exchange zones $Z_N$, $Z_{N+1}$, $Z'_N$, $Z'_{N+1}$ can be materialized by heat exchangers such as plate exchangers or tubular exchangers, for example, in which the primary fluid and the secondary fluid flow in opposite directions. Moreover, and this is transposable in all illustrated variants, the heat exchange zones can be insulated thermally from each other in a same interface by interposing a thermally insulating sheet or layer, for example.

At every iteration or change of the primary fluid flow direction, the latter is displaced either in one unidirectional primary circuit portion $P_{1,N}$, $P'_{1,N}$ or in the other portion $P_{1,N+1}$, $P'_{1,N+1}$. Hence, all the primary fluid, that is to say as well the primary fluid coming from one iteration as that coming from the other, can perform a heat exchange with the secondary fluid flowing countercurrent. This applies to all thermal apparatuses of this patent application comprising a heat exchange zone at the level of every unidirectional primary circuit portion $P_{1,N}$, $P_{1,N+1}$, $P'_{1,N}$, $P'_{1,N+1}$.

So, thanks to the invention, the heat exchange between a primary fluid coming from a thermal apparatus in which it is displaced sequentially alternately in two opposite directions and a secondary fluid that flows in one single direction is optimized in heat exchange zones $Z_N$, $Z_{N+1}$, $Z'_N$, $Z'_{N+1}$, $Z_{N,N+1}$, $Z'_{N,N+1}$, in which the primary fluid is rectified and flows in one single flow direction, countercurrent with respect to the secondary fluid. Moreover, increasing the number of heat exchange zones $Z_N$, $Z_{N+1}$, $Z'_N$, $Z'_{N+1}$, $Z_{N,N+1}$, $Z'_{N,N+1}$, allows increasing the heat exchange capacity between the primary circuit and the secondary circuit, and therefore the ability of thermal apparatus 1, 10, 20, 30, 40, 50, 60, 70 to exchange with an external application or device connected with secondary au circuit $S_{1,1}$, $S_{1,2}$, $S_{10,1}$, $S_{10,2}$, $S_{20,1}$, $S_{20,2}$, $S_{30,1}$, $S_{30,2}$, $S_{40,1+N}$, $S_{40,1+N+1}$, $S_{50,1}$, $S_{60,1}$, $S_{70,1}$, $S_{70,2}$.

So heat generator 1, 10, 20, 30, 40, 50, 60, 70 according to the invention shows an optimization of the heat exchange between a primary circuit, in which a heat transfer fluid circulates in a reciprocating movement, and a secondary circuit, in which a heat transfer fluid circulates in a unidirectional movement.

This goal is achieved by the specific arrangement of the primary circuit, which is divided at division points D into primary circuit portions in which the primary fluid flows in one single direction, these unidirectional primary circuit portions being associated with an exchange interface arranged between the division points and in which the primary fluid and the secondary fluid flow constantly in opposite directions with respect to each other.

This arrangement leads to the increase of the heat exchange capacity between the primary circuit and the secondary circuit, and therefore to best exploitation or extraction of the energy produced in the core of the heat generator, Moreover, and preferably, exchange interface $I_{1,1}$, $I_{1,2}$, $I_{10,1}$, $I_{10,2}$, $I_{20,1}$, $I_{20,2}$, $I_{30,1}$, $I_{30,2}$, $I_{40,1}$, $I_{50,1}$, $I_{60,1}$, $I_{70,1}$, $I_{70,2}$ is positioned in a unidirectional primary circuit portion directly connected to two division points. This allows optimizing further the heat exchange and in particular reducing the volume of primary fluid that is not in the core of the apparatus.

Figure 2:
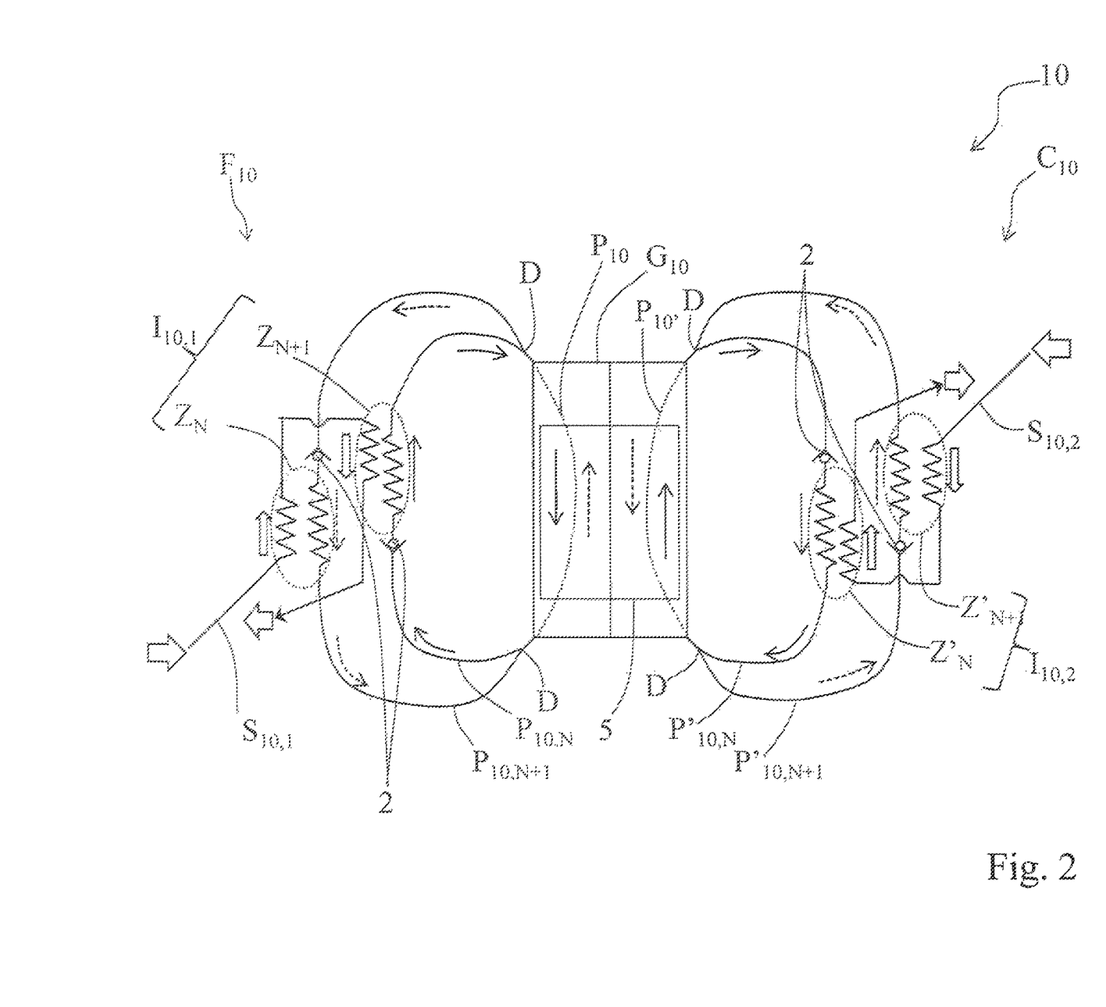
FIG. 2 is a schematic view of a thermal apparatus according to a second embodiment variant.

Thermal apparatus 10 represented in FIG. 2 differs from that of FIG. 1 only by the configuration of primary circuit $P_{10}$, $P_{10'}$, which comprises two closed and dissociated fluid loops. This apparatus calls for the same advantages and comments than those set forth in reference to thermal apparatus 1 represented in FIG. 1.

Figure 3:
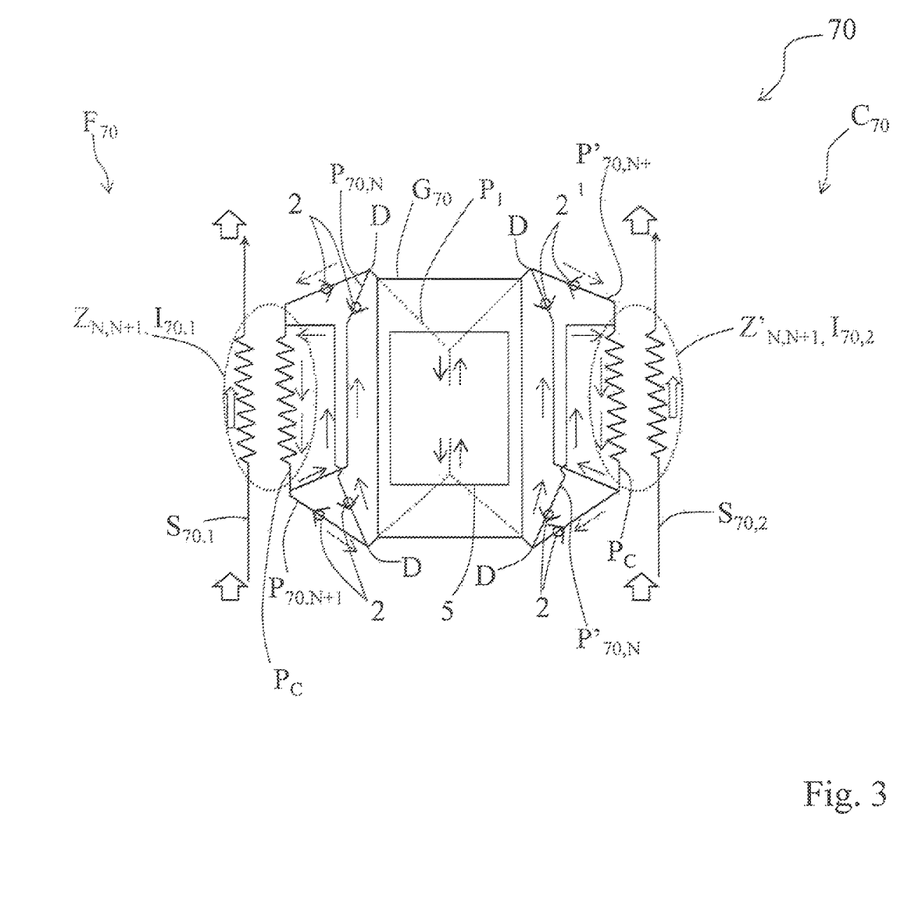
FIG. 3 is a schematic view of a thermal apparatus according to a third embodiment variant.

Thermal apparatus 70 represented in FIG. 3 differs from that of FIG. 1 by the configuration of its heat exchange zones $Z_{N,N+1}$, $Z'_{N,N+1}$. In fact, unidirectional primary circuit portions $P_{70,N}$ and $P_{70,N+1}$, respectively $P'_{70,N}$, and $P'_{70,N+1}$ meet in a common unidirectional primary circuit portion $P_C$ in which the primary fluid flows unidirectionally thanks to devices 2 controlling the flow direction of the primary fluid. Advantageously, the primary fluid that flows in this common portion $P_C$ comes from the two corresponding unidirectional primary circuit portions $P_{70,N}$ and $P_{70,N+1}$, respectively $P'_{70,N}$, and $P'_{70,N+1}$ and therefore from each iteration, so that this primary fluid flows continuously and unidirectionally. The heat exchange between the primary fluid and the secondary fluid is therefore optimized. The fluid coming from every iteration is directed into a same exchanger circuit, which simplifies the architecture of the heat exchanger.

Exchange interface $I_{70,1}$ located on cold side $F_{70}$ is formed by a heat exchanger whose exchange circuits integrate a part of secondary circuit $S_{70,1}$, in which a secondary fluid is flowing, and common portion $P_C$ of unidirectional primary circuit portions $P_{70,N}$, $P_{70,N+1}$. In this exchange interface $I_{70,1}$, the primary and secondary fluids flow in two opposite directions. The same applies to exchange interface $I_{70,2}$ located on hot side $C_{70}$. This embodiment variant is particularly advantageous as it allows reducing the size, since only one primary circuit portion, that is to say common portion $P_C$, performs the heat exchange with secondary circuit $S_{70,1}$, $S_{70,2}$. Moreover, this heat exchange is performed at every iteration or flow direction change of the primary fluid.

Figure 4:
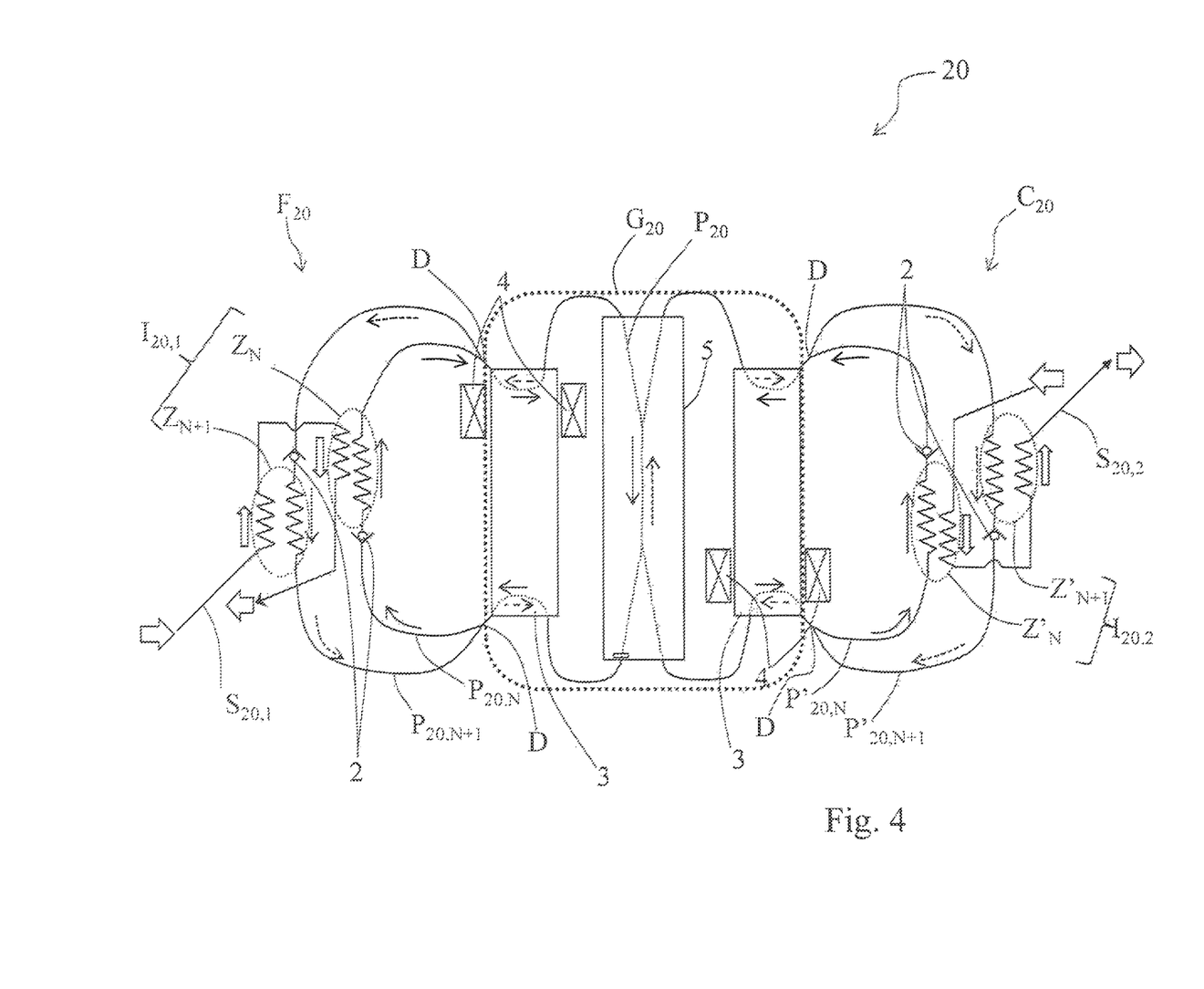
FIG. 4 is a schematic view of a thermal apparatus according to a fourth embodiment variant.

The thermal apparatus 20 represented in FIG. 4 is a magnetocaloric thermal apparatus. This is a thermal apparatus of the type of that represented in FIG. 1, in which the thermal energy is obtained in the core $G_{20}$ of thermal apparatus 20 by the exploitation of the magnetocaloric effect of so-called magnetocaloric effect materials. The thermal apparatus 20 represented comprises to that purpose at least two magnetocaloric elements 3 represented schematically, through which the primary fluid of primary circuit $P_{20}$ is flowing.

Every magnetocaloric element 3 can be made of one or several magnetocaloric materials through which the primary fluid can flow. To that purpose, said magnetocaloric materials can be porous so that their pores form through fluid passages. They can also have the form of a solid block in which mini or micro channels are machined, or they can be made of an assembly of superposed, possibly grooved plates, between which the heat transfer fluid can flow. They can also have the form of powder or particles, so that the gaps form fluid passages. Any other embodiment allowing the primary fluid to perform heat exchange with every magnetocaloric element 3 may of course be suitable. A particular configuration can thus comprise a magnetocaloric element in the form of a blade through which the primary fluid does not flow, but which is in contact with said primary fluid circulating for example in two opposite directions on the upper and lower surfaces of this blade, so as to exit every time at one of the ends of said blade forming the ends of the thermal module including this blade. The magnetocaloric elements can have the shape of a disk containing magnetocaloric material in the form of blades stacked with spaces between them to form passage channels for the primary fluid.

A magnetic arrangement 4 comprising permanent magnets is moved with respect to magnetocaloric elements 3 to subject them alternately to a magnetic field variation and create alternately in magnetocaloric elements 3 a heating phase and a cooling phase. This magnetic arrangement 4 can also have the form of a sequentially powered electromagnet or of any other similar means liable to generate a magnetic field variation. The flow direction changes of the primary fluid in primary circuit $P_{20}$ are synchronized with the magnetization and demagnetization phases of magnetocaloric elements 3 in order to establish a thermal gradient within said magnetocaloric material.

This type of magnetocaloric thermal apparatus 20 also comprises a cold side $F_{20}$ and a hot side $C_{20}$ located respectively on the left and on the right in FIG. 4. Primary circuit $P_{20}$ is divided on cold side $F_{20}$ in two unidirectional primary circuit portions $P_{20,N}$, $P_{20,N+1}$ and on hot side $C_{20}$, in two other unidirectional primary circuit portions $P'_{20,N}$, $P'_{20,N+1}$. The heat exchange interfaces $I_{20,1}$ and $I_{20,2}$ on the hot and cold side are intended to allow performing an optimized heat exchange between the primary fluid and the secondary fluid, while the primary fluid and the secondary fluid flow countercurrent in them thanks to the presence of the devices 2 controlling the flow direction in unidirectional primary circuit portions $P_{20,N}$, $P'_{20,N+1}$, $P'_{20,N}$, $P'_{20,N+1}$. So, at every magnetic phase and, therefore, regardless of the flow direction of the primary fluid, a heat exchange is constantly performed countercurrently in interfaces $I_{20,1}$ and $I_{20,2}$.

Preferably, and this is the case in all thermal appliances 1, 10, 20, 30, 40, 50, 60 according to the invention, division point D of the primary circuit made of several unidirectional primary circuit portions $P_{1,N}$, $P_{1,N+1}$, $P_{10,N}$, $P_{10,N+1}$, $P_{20,N}$, $P_{20,N+1}$, $P_{30,N}$, $P_{30,N+1}$, $P_{40,N}$, $P_{40,N+1}$, $P_{50,N}$, $P_{50,N+1}$, $P_{60,N}$, $P_{60,N+1}$ is located as close as possible to core $G_1$, $G_{10}$, $G_{20}$, $G_{30}$, $G_{40}$, $G_{50}$, $G_{60}$ of thermal apparatus 1, 10, 20, 30, 40, 50, 60, that is to say to the zone(s) of the thermal apparatus in which the primary fluid becomes loaded with thermal energy. This allows reducing the so-called dead volumes of primary liquid located in the parts of the circuit where the primary fluid flows alternately. For a magnetocaloric heat generator 20, 30, this zone ideally corresponds to the area where the primary fluid exits magnetocaloric elements 3.

Figure 5:
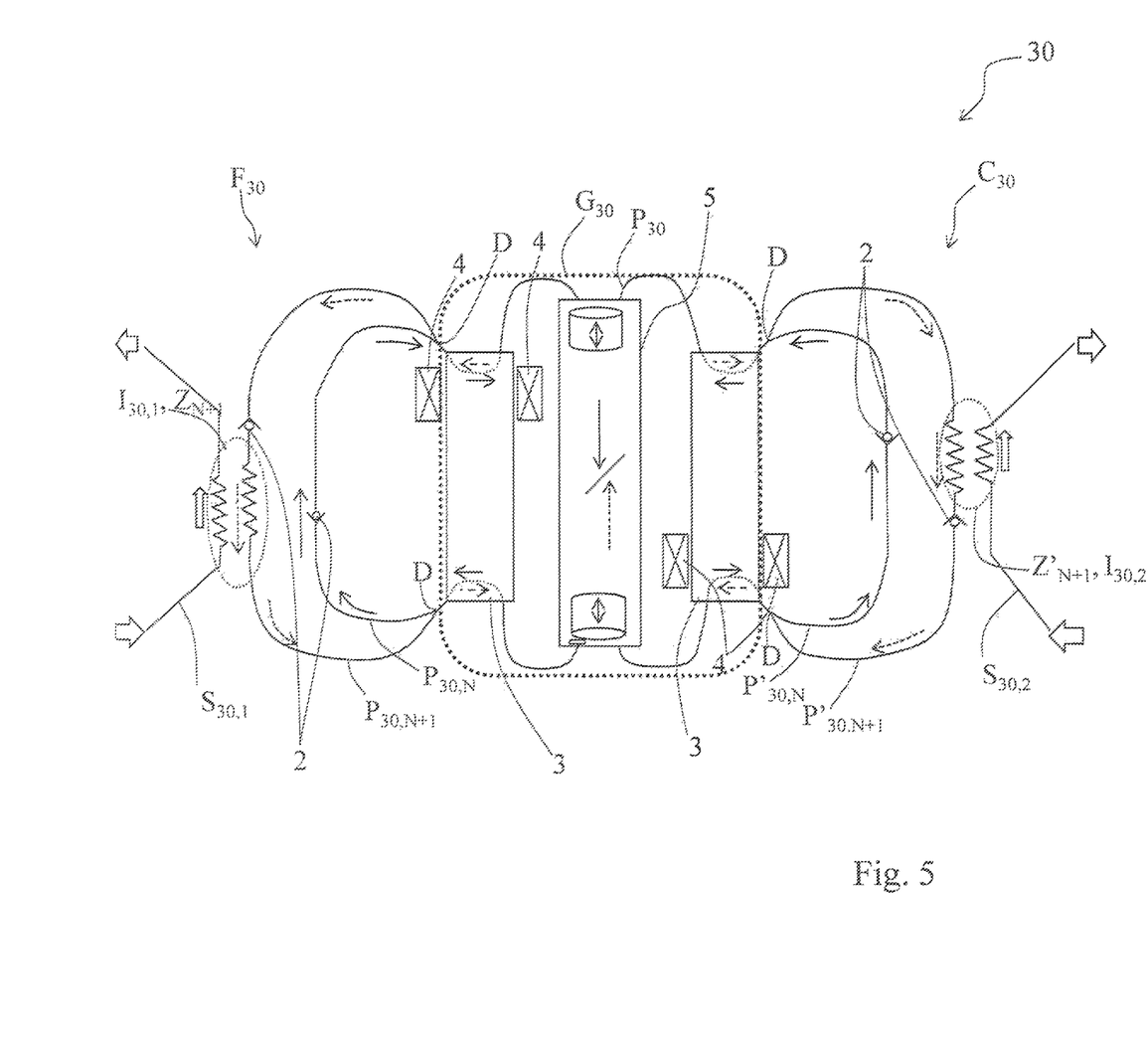
FIG. 5 is a schematic view of a thermal apparatus according to a fifth embodiment variant.

The thermal apparatus 30 represented in FIG. 5 is also a magnetocaloric thermal apparatus. It differs from that of FIG. 4 by the number of exchange zones $Z_{N+1}$, $Z'_{N+1}$. In fact, in this configuration, only one unidirectional primary circuit portion $P_{30,N+1}$, $P'_{30,N+1}$ comprises a heat exchange zone $Z_{N+1}$, $Z'_{N+1}$. Such a configuration can be used when it is desired to limit the heat exchanges with the secondary fluid.

When the thermal apparatus according to the invention is a magnetocaloric thermal apparatus, it can comprise a different number of magnetocaloric elements 3. In fact, the invention is not restricted to the integration of only two magnetocaloric elements 3 in a core $G_{20}$, $G_{30}$ of a magnetocaloric thermal apparatus 20, 30, it is possible to integrate only one or more than two of them.

Even though, in the described embodiment examples, the thermal apparatuses 1, 10, 20, 30 comprise identical heat exchange interfaces $I_{1,1}$, $I_{1,2}$, $I_{10,1}$, $I_{10,2}$, $I_{20,1}$, $I_{20,2}$, $I_{30,1}$, $I_{30,2}$ on the hot and cold sides, the invention is not restricted to this configuration. In fact, according to the application, it may be necessary to install different interfaces $I_{1,1}$, $I_{1,2}$, $I_{10,1}$, $I_{10,2}$, $I_{20,1}$, $I_{20,2}$, $I_{30,1}$, $I_{30,2}$ the hot side and on the cold side.

Figure 6:
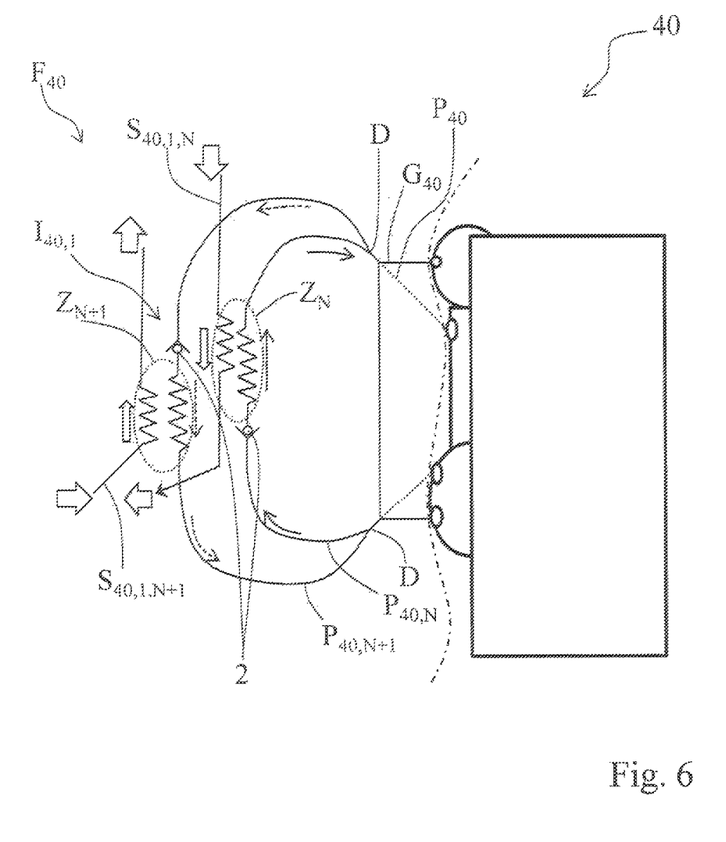
FIG. 6 is a schematic view of a cold side of a thermal apparatus according to a sixth embodiment variant.
Figure 7:
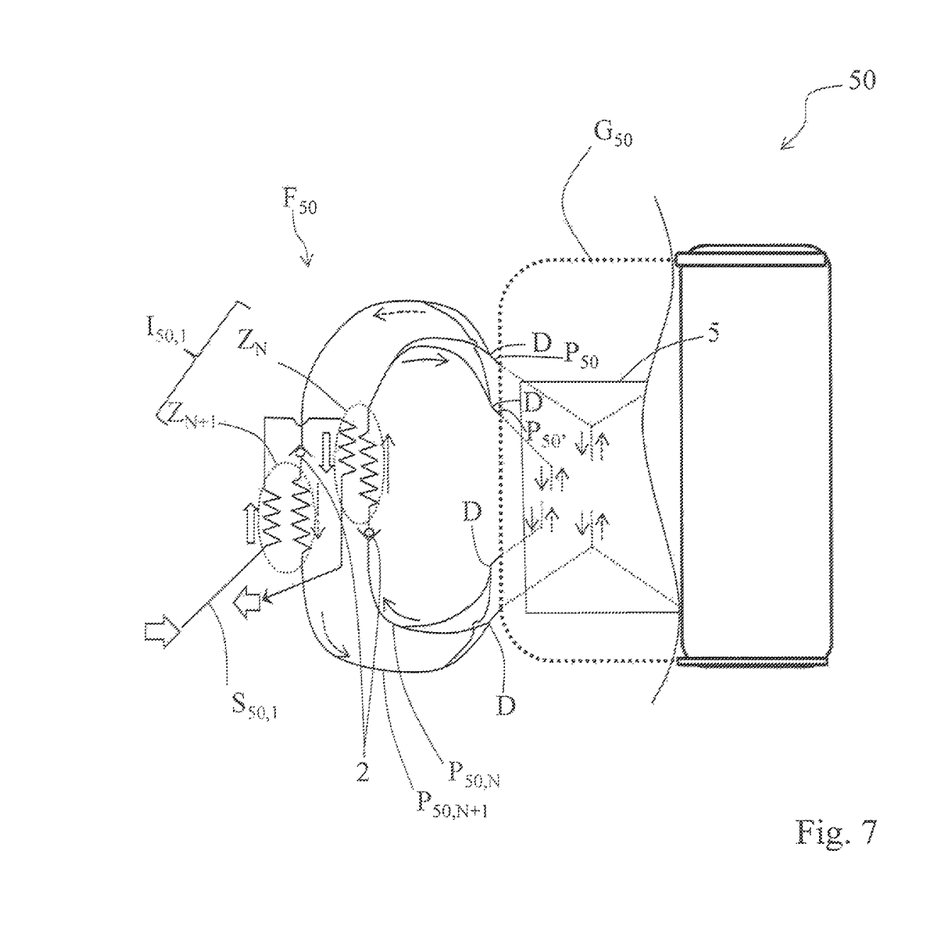
FIG. 7 is a schematic view of a cold side of a thermal apparatus according to a seventh embodiment variant.
Figure 8:
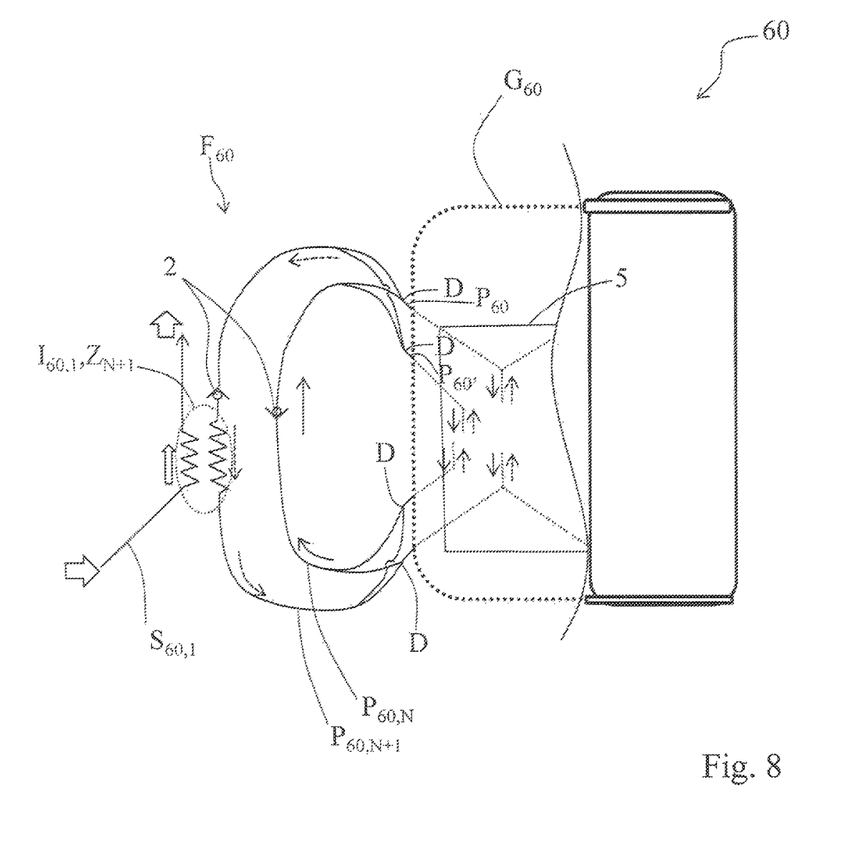
FIG. 8 is a schematic view of a cold side of a thermal apparatus according to an eighth embodiment variant.

To that purpose, only cold side $F_{40}$, $F_{50}$, $F_{60}$ of thermal apparatuses 40, 50, 60 is represented in FIGS. 6, 7, 8, and the corresponding hot side may have the same configuration or a different configuration.

So, cold side $F_{40}$ of thermal apparatus 40 represented in FIG. 6 differs from that of thermal apparatuses 1, 10, 20 of FIGS. 1, 2, 4 by the presence of two secondary circuits $S_{40,1,N}$ and $S_{40,1,N+1}$ configured to perform a heat exchange respectively in the two heat exchange zones $Z_N$ and $Z_{N+1}$. The heat insulation between the two heat exchange zones $Z_N$ and $Z_{N+1}$ is particularly adapted in this configuration. This variant can also be transposed to the hot side of thermal apparatus 40. It is however possible to realize the cold side and the hot side of such thermal apparatus according to different configurations.

Thermal apparatus 50 represented in FIG. 7 comprises two primary circuits $P_{50}$ and $P_{50'}$, which comprise common unidirectional primary circuit portions $P_{50,N}$, $P_{50,N+1}$, that is to say that the primary fluids or both primary circuits $P_{50}$ and $P_{50'}$ come together in them. In other words, heat exchange interface $I_{50,1}$ is common to both primary circuits $P_{50}$ and $P_{50'}$. This allows in particular optimizing the volume of thermal apparatus $G_{50}$ while ensuring an improved thermal exchange. Of course, the invention is not restricted to one or two primary circuits per heat exchange interface, more than two primary circuits may be assigned to one single heat exchange interface, according to the thermal output of the thermal appliance and/or the required exchange capacity. A variant in which the unidirectional primary circuit portions are dissociated, but arranged in a common heat exchange zone, which is not illustrated, is also contemplated in this invention.

Thermal apparatus 60 represented in FIG. 8 differs from that represented in FIG. 7 by the presence of one single heat exchange zone $Z_{N+1}$ in interface $I_{60,1}$: only one unidirectional primary circuit portion $P_{60,N+1}$ which is common to both primary circuits $P_{60}$ and $P_{60'}$ comprises a heat exchange zone $Z_{N+1}$. This configuration calls for the same comments than those set forth in reference to FIG. 5.

POSSIBILITIES FOR INDUSTRIAL APPLICATION:

This description shows clearly that the invention allows reaching the goals defined, that is to say offer a thermal apparatus 1, 10, 20, 30, 40, 50, 60 liable to improve the heat exchange between a primary fluid whose initial displacement is alternated and a secondary fluid whose displacement is unidirectional and preferably continuous.

Thermal apparatus 1, 10, 20, 30, 40, 50, 60 according to the invention can find an application, as well industrial as domestic, in the area of heating, air conditioning, tempering, cooling or others, at competitive costs and with reduced space requirements.

The present invention is not restricted to the examples of embodiment described, but extends to any modification and variant which is obvious to a person skilled in the art while remaining within the scope of the protection defined in the attached claims.

The invention claimed is:

1. A thermal apparatus comprising an apparatus core in which thermal energy is produced, the thermal apparatus comprising at least one primary circuit in which a heat transfer primary fluid is capable of circulating,
  the primary fluid being moved in the primary circuit in a reciprocating movement by a displacement device, and at least one heat exchange interface wherein the primary fluid interfaces with a secondary fluid that circulates unidirectionally in a secondary circuit,
  wherein the primary circuit is divided into at least two unidirectional primary circuit portions and comprises division points located at an outlet of the core of the thermal apparatus, so that, at every flow direction change of the primary fluid, the primary fluid flows through one portion of the unidirectional primary circuit portions,
  each of the at least two portions of the unidirectional primary circuit is delimited by two division points, and the at least one heat exchange interface arranged between these two division points comprises at least one heat exchange zone in which the primary fluid and the secondary fluid flow unidirectionally and countercurrent with respect to one another, the at least one heat exchange zone comprises at least one common unidirectional primary circuit portion in which the at least two portions of the unidirectional primary circuit come together, and the at least two portions of the unidirectional primary circuit come together, and the at least two portions of the unidirectional primary circuit is provided with a device for controlling a flow direction of the primary fluid capable of forcing an unidirectional flow direction of the primary fluid and is arranged so that the primary fluid flows in the at least one common unidirectional primary circuit portion continuously and unidirectionally at each iteration.

2. The thermal apparatus according to claim 1, wherein the displacement device (5) is integrated in a section of the primary circuit ($P_{70}$) in which the fluid moves alternately in two opposite directions.

3. The thermal apparatus according to claim 2, wherein the displacement device (5) is integrated in the core ($G_{70}$) of the thermal apparatus (70).

4. The thermal apparatus according to claim 1, wherein the primary circuit ($P_{70}$) is divided in two unidirectional primary circuit portions ($P'_{70,N}$, $P'_{70,N+1}$).

5. The thermal apparatus according to claim 4, wherein each of the two unidirectional primary circuit portions ($P_{70,N}$, $P_{70,N+1}$, $P'_{70,N}$, $P'_{70,N+1}$) is at least partly integrated in the heat exchange zone ($Z_{N,N+1}$, $Z'_{N,N+1}$).

6. The thermal apparatus according to claim 1, wherein the exchange interface comprises several portions of a same secondary circuit.

7. The thermal apparatus according to claim 1, wherein the exchange interface comprises portions of several secondary circuits.

8. The thermal apparatus according to claim 1, wherein the thermal apparatus comprises several primary circuits, and the heat exchange zone comprises at least a part of a common unidirectional primary circuit portion in which the primary fluids of the primary circuits come together.

9. The thermal apparatus according to claim 1, wherein the thermal apparatus comprises at least one magnetocaloric element (3) forming the core of the apparatus and through which the primary fluid passes, and a magnetic arrangement (4) alternately subjects the magnetocaloric element (3) to a magnetic field variation and alternately creates, in the magnetocaloric element (3), a heating phase and a cooling phase.

10. The thermal apparatus according to claim 9, wherein the division points (D) are positioned at the level of the primary fluid outlet area of the magneto caloric element (3).

* * * * *